United States Patent
Brigham (10) Patent No.: US 11,976,772 B2
(45) Date of Patent: May 7, 2024

(54) PIPE INSULATION SPACER SYSTEM

(71) Applicant: INTEGRITY PRODUCTS & SUPPLIES INC., Sherwood Park (CA)

(72) Inventor: Graham Brigham, Sherwood Park (CA)

(73) Assignee: Integrity Products & Supplies Inc., Sherwood Park (CA)

( * ) Notice: Subject to any disclaimer, the term of this patent is extended or adjusted under 35 U.S.C. 154(b) by 218 days.

(21) Appl. No.: 17/683,430

(22) Filed: Mar. 1, 2022

(65) Prior Publication Data

US 2022/0341536 A1 Oct. 27, 2022

(30) Foreign Application Priority Data

Apr. 21, 2021 (CA) ........................ 3115685

(51) Int. Cl.
*F16L 59/12* (2006.01)

(52) U.S. Cl.
CPC .................... *F16L 59/12* (2013.01)

(58) Field of Classification Search
CPC ......... F16L 59/06; F16L 59/07; F16L 59/075; F16L 59/08; F16L 59/12; F16L 59/14
USPC .................... 138/148, 149, 112–114
See application file for complete search history.

(56) References Cited

U.S. PATENT DOCUMENTS

| | | |
|---|---|---|
| 3,126,918 A | 3/1964 | Eaton |
| 3,354,021 A | 11/1967 | Royet |
| 3,374,308 A * | 3/1968 | Haas .................. F16L 7/00 174/138 R |
| 3,575,445 A | 4/1971 | French |
| 6,883,548 B2 | 4/2005 | Schippl |
| 6,981,525 B2 | 1/2006 | Foxton |
| 7,278,469 B2 | 10/2007 | Sasaki et al. |
| 9,422,718 B2 | 8/2016 | Ehsani |
| 9,958,105 B1 | 5/2018 | Dye et al. |
| 10,577,871 B2 * | 3/2020 | Cherkaoui ............. F16L 53/30 |
| 2006/0196568 A1 | 9/2006 | Leeser et al. |
| 2021/0172561 A1 * | 6/2021 | Brigham ............. F16L 59/06 |

FOREIGN PATENT DOCUMENTS

| | | |
|---|---|---|
| CN | 104100209 B | 8/2016 |
| DE | 20312090 U1 | 11/2003 |
| EP | 0132777 A2 | 2/1985 |
| EP | 1457729 A1 | 9/2004 |
| EP | 3640518 A1 | 4/2020 |

(Continued)

*Primary Examiner* — Patrick F Brinson
(74) *Attorney, Agent, or Firm* — Finch & Maloney PLLC (57) ABSTRACT

A pipe insulation spacer system has a first spacer ring and a second spacer ring. Each of the first spacer ring and the second spacer ring have a flexible band. The flexible band has a bottom with a plurality of feet. The plurality of feet engage an outer surface of the process pipe such that the flexible band is spaced from the outer surface of the process pipe. An inner cladding has a body with a first end, a second end, and a pair of peripheral side edges. The first end of the inner cladding is supported by the first end spacer ring and the second end of the inner cladding is supported by the second end spacer ring. The inner cladding wraps around the process pipe such that the pair of peripheral side edges are adjacent each other and the inner cladding is spaced from the process pipe.

21 Claims, 8 Drawing Sheets

(56) References Cited

FOREIGN PATENT DOCUMENTS

| WO | 9102143 A1 | 2/1991 |
| WO | 2014086332 A1 | 6/2014 |
| WO | 2015140221 A1 | 9/2015 |
| WO | 2016030076 A1 | 3/2016 |
| WO | 2016093716 A1 | 6/2016 |

\* cited by examiner

PIPE INSULATION SPACER SYSTEM

FIELD OF THE DISCLOSURE

The present application relates generally to n insulation spacer system. More specifically it relates to a pipe insulation spacer system for use on high temperature process pipes.

BACKGROUND

This section provides background information to facilitate a better understanding of the various aspects of the invention. It should be understood that the statements in this section of this document are to be read in this light, and not as admissions of prior art.

Moisture in insulated pipe systems can cause corrosion and premature failures of the process pipe. In addition to potential moisture ingress from the surroundings, such as rain, snow, and chemical fumes, it is common for high heat process pipes to sweat. This can significantly increase the moisture within the insulated pipe system and cause corrosion under insulation. Controlling this sweat moisture can improve insulation quality and reduce the frequency that pipes need replacing due to corrosion.

BRIEF SUMMARY

There is provided a pipe insulation spacer system for use on a process pipe. A first spacer ring and a second spacer ring is provided. Each of the first end spacer ring and the second end spacer ring have a flexible band. The flexible band has a top, a bottom, a pair of peripheral sides, a first end, and a second end. The bottom of the flexible band has a plurality of feet. The feet of each of the first end spacer ring and the second end spacer ring engage an outer surface of the process pipe such that the flexible band is spaced from the outer surface of the process pipe. The first end of the flexible band is linked to the second end of the flexible band such that the flexible band is held on the process pipe. An inner cladding is provided that has a body. The body has a first end, a second end, and a pair of peripheral side edges. The first end of the inner cladding is supported by the first end spacer ring and the second end of the inner cladding is supported by the second end spacer ring. The inner cladding wraps around the process pipe such that the pair of peripheral side edges are adjacent each other and the inner cladding is spaced from the process pipe.

In one embodiment, the first end of the flexible band is linked to the second end of the flexible band using a tie wire.

In one embodiment, the pair of the peripheral side edges are positioned at a bottom of the system.

In one embodiment, the pair of the peripheral side edges are spaced apart from each other to create a drain.

In one embodiment, the plurality of feet are made of mica.

In one embodiment, the flexible elongate bodies are made of aluminum.

In one embodiment, the plurality of feet are riveted onto the flexible band.

In one embodiment, at least one mid support ring is provided. Each of the at least one mid support rings has a flexible band. The flexible band has a top, a bottom, a pair of peripheral sides, a first end, and a second end. The bottom has a plurality of feet. The feet of the mid support ring engage an outer surface of the process pipe such that the flexible band is spaced from the outer surface of the process pipe. The first end of the flexible band is linked to the second end of the flexible band such that the flexible band is held on the process pipe.

In one embodiment, one of the mid support rings is positioned centrally between the first end spacer ring and the second end spacer ring.

In one embodiment, each of the mid support rings is positioned equidistant from each other.

In one embodiment, insulation material is provided. The insulation material has an inner surface and an outer surface. The insulation material is positioned exterior to the inner cladding.

In one embodiment, an outer cladding is provided. The outer cladding is positioned exterior to the outer surface of the insulation material.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

A pipe insulation spacer system, generally identified by reference numeral 10, will now be described with reference to FIG. 1 through FIG. 8.

Figure 5:
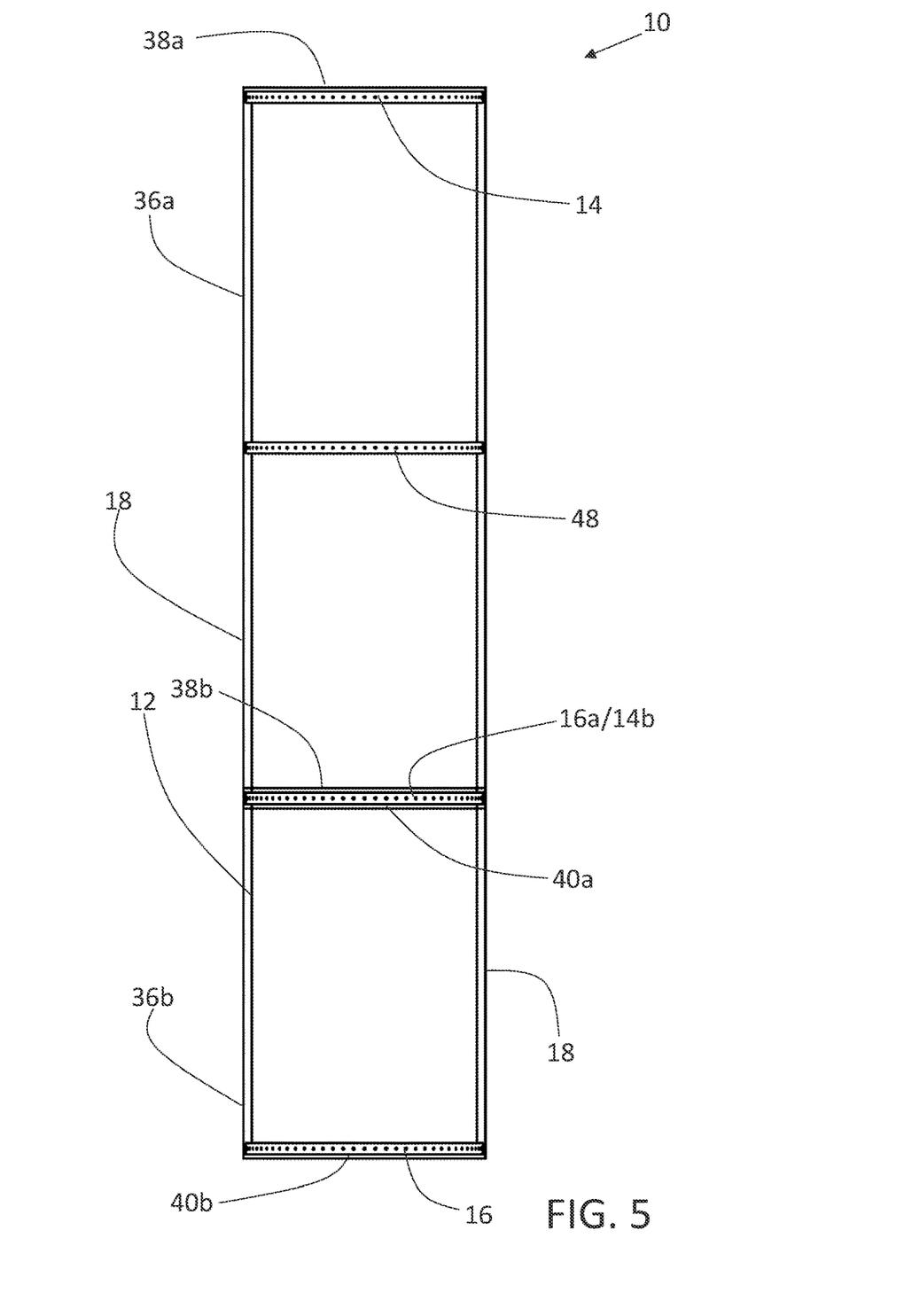
FIG. 5 is a top plan view, partially in section, of a pipe insulation spacer ring.
Figure 7:
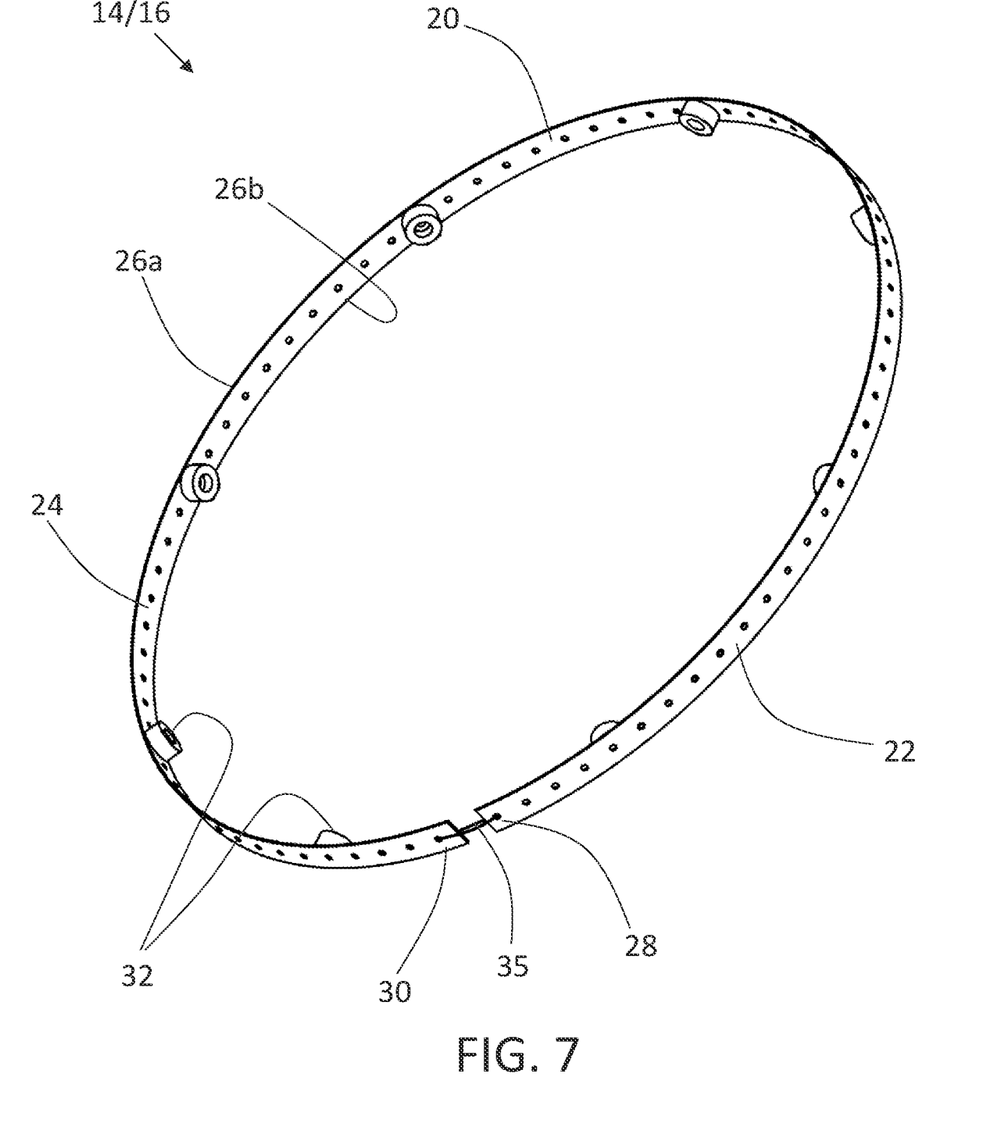
FIG. 7 is a perspective view of a spacer ring.

Referring to FIG. 5, a pipe insulation spacer system 10 for use on a process pipe 12 has a first end spacer ring 14, a second end spacer ring 16 and an inner cladding 18. While system 10 can be used in any pipe insulation system, it may be best suited for high heat process pipes such as those with temperatures above 260 degrees Celsius. Referring to FIG. 7, first end spacer ring 14 and second end spacer ring 16 each have a flexible band 20. Flexible band 20 may be made of aluminum, suitable flexible metal or any other suitable material known to a person skilled in the art. Each flexible band 20 has a top, a bottom 24, a pair of peripheral sides 26a and 26b, a first end 28 and a second end 30. Bottom 24 has a plurality of feet 32. Feet 32 may be made of mica, PTFE, silicon, ceramics or any other high temperature composite material known to a person skilled in the art. Feet 32 may extend from peripheral side 26a to peripheral side 26b or may extend only a portion of the distance between peripheral side 26a to peripheral side 26b. Feet 32 may be attached to flexible band 20 by rivets, screws, clamps, glue or any other suitable method of attachment known to a person skilled in the art. In the embodiment shown in FIG. 7, feet 32 are cylindrical in shape with a central aperture through which rivets or screws may pass for connecting to feet 32 to flexible band 20. It will be understood by a person skilled in the art that feet 32 may have different shapes. In the embodiment shown, feet 32 are spaced equidistantly from each other. It will be understood by a person skilled in the art that feet 32 may be spaced at the same or different intervals on flexible band 20. In the embodiment shown in FIG. 2, feet 32 of each of first end spacer ring 14 and second end spacer ring 16 that engages an outer surface 34 of process pipe 12 such that flexible band 20 is spaced from outer surface 34 of process pipe 12. First end 28 of flexible band 20 is linked to second end 30 such that flexible band 20 is held on process pipe 12. In the embodiment shown, first end 28 of flexible band 20 is linked to second end 30 using a tie wire 35. It will be understood by a person skilled in the art that first end 28 and second end 30 may be linked together by staples, welding, rope, screws, soldering, brazing or any other method of linking known to a person skilled in the art.

Figure 1:
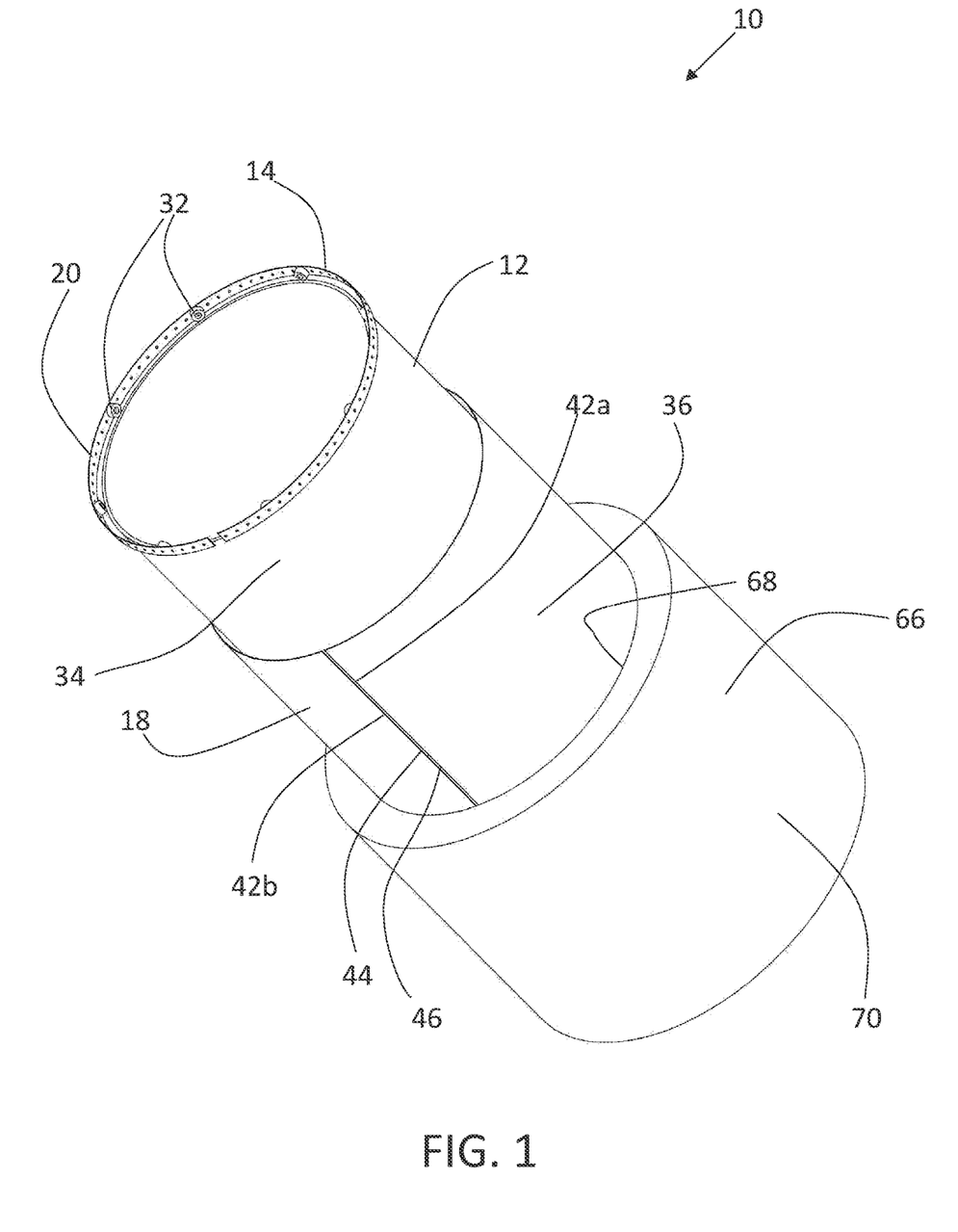
FIG. 1 is a perspective view, partially in section, of a pipe insulation spacer system.

Referring to FIG. 5, inner cladding 18 has bodies 36a and 36b that has a first end 38a and 38b, respectively, a second end 40a and 40b, respectively. Referring to FIG. 1, inner cladding 18 has a pair of peripheral side edges 42a and 42b. Referring to FIG. 5, first ends 38a of inner cladding 18 is supported by first end spacer ring 14. Second end 40b of inner cladding 18 is supported by second end spacer ring 16. Inner cladding 18 wraps around process pipe 12 such that peripheral side edges 42a and 42b are adjacent each other and inner cladding 18 is spaced from process pipe 12. The space between process pipe 12 and inner cladding 18 allows for air flow which can help mitigate corrosion that may otherwise occur on process pipe 12. Referring to FIG. 1, in the embodiment shown, peripheral side edges 42a and 42b are positioned at a bottom 44 of system 10. Peripheral side edges 42a and 42b may be spaced apart from each other to create a drain 46. Drain 46 allows moisture to drain away from process pipe 12 and ultimately out of system 10 using methods known to a person skilled in the art. In the embodiment shown in FIG. 5, when more than one inner cladding 18 is used to cover process pipe 12, first end 38b of a second body 36b may overlap second end 40a of first body 36a. This results in a single spacer ring acting as a second end spacer ring 16a for first body 36a and a first end spacer ring 14b for second body 36b.

Figure 6:
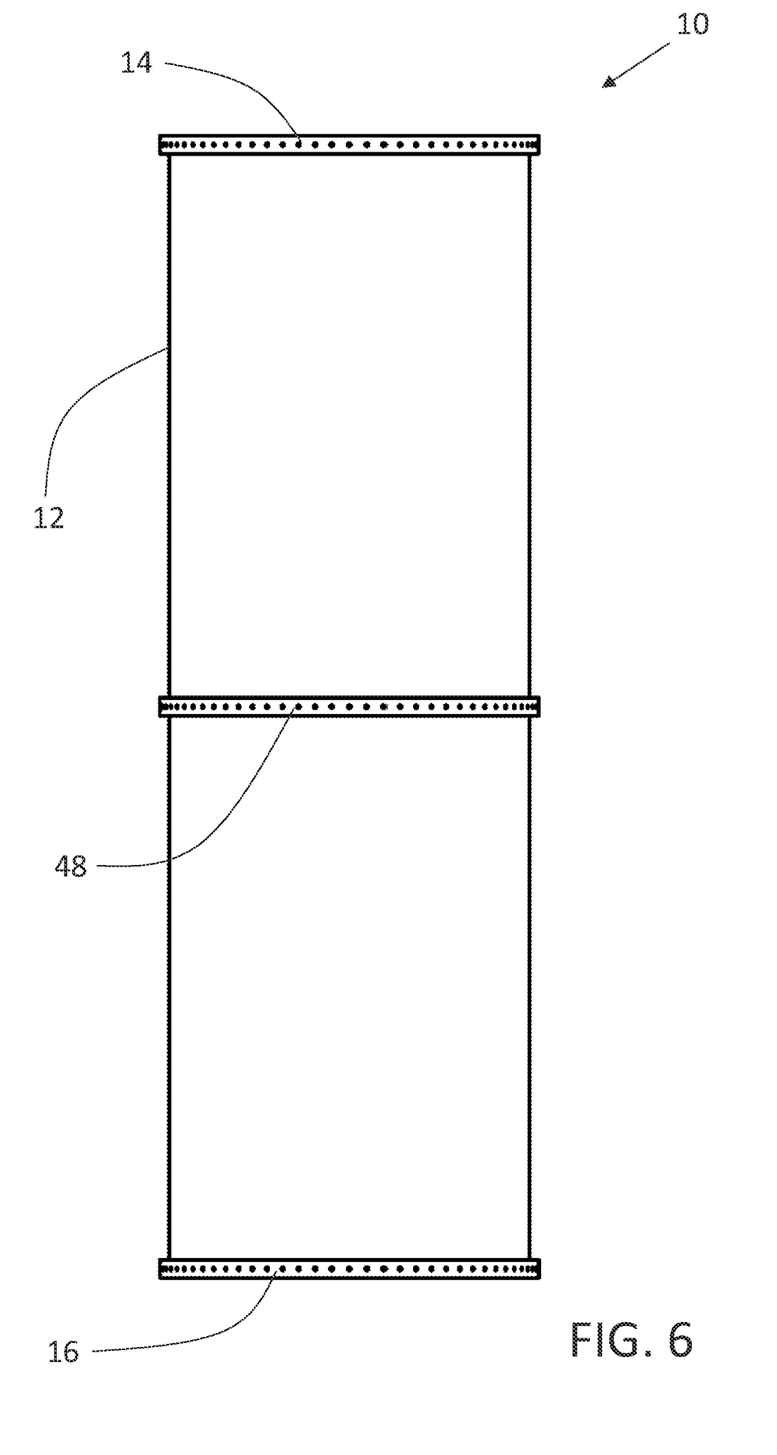
FIG. 6 is a top plan view of a process pipe with spacer rings.
Figure 8:
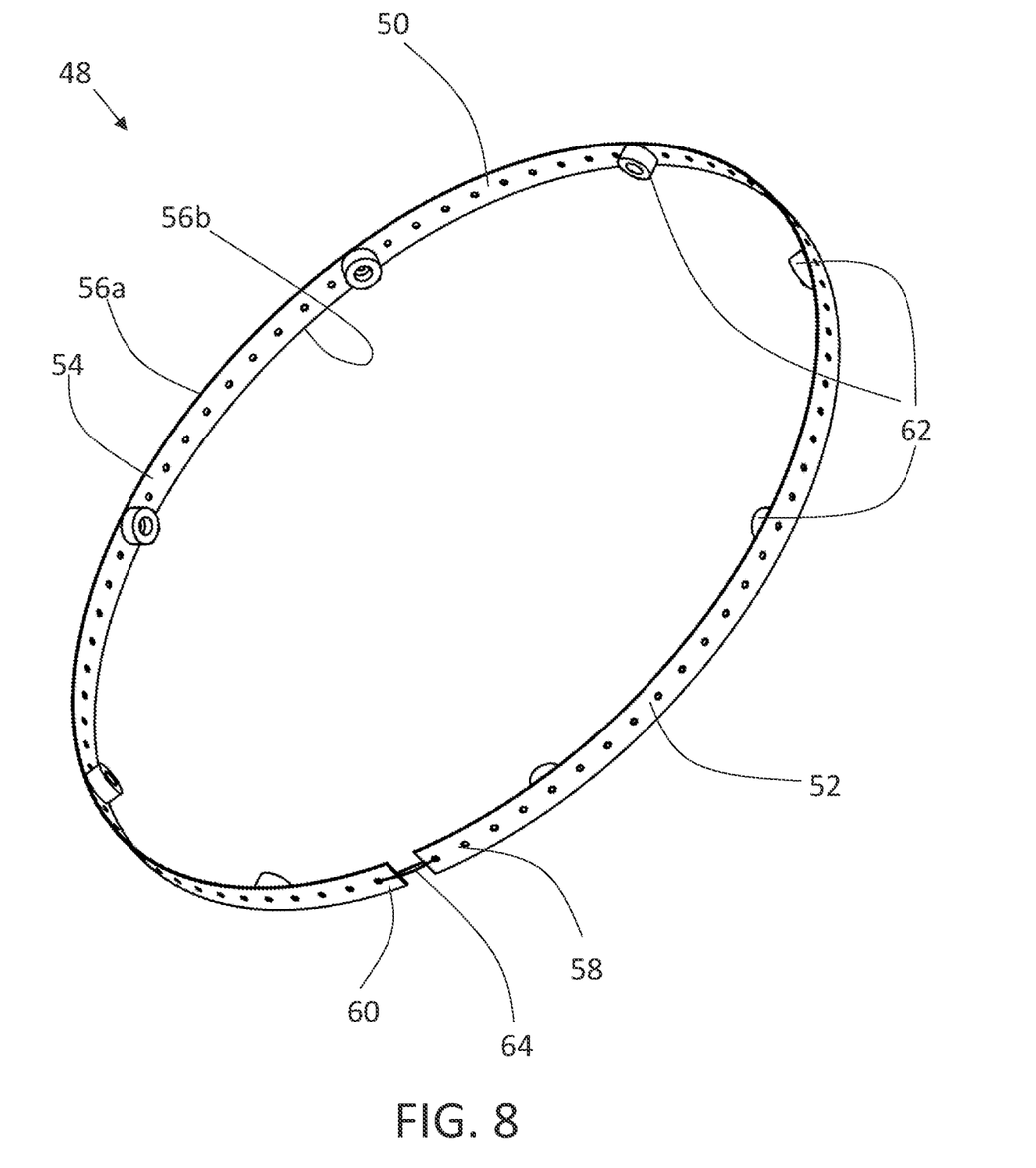
FIG. 8 is a perspective view of a mid support ring.

In the embodiment shown in FIG. 6, at least one mid support ring 48 is used to provide additional support to inner cladding 18, not shown. Mid support rings 48 are positioned between first end spacer ring 14 and second end spacer ring 16. The number of mid support rings 48 used may vary depending upon the length of inner cladding 18 and the diameter of process pipe 12. In the embodiment shown in FIG. 6, a single mid support ring 48 is positioned centrally between first end spacer ring 14 and second end spacer ring 16. In the embodiment shown in FIG. 4, mid support rings 48 are positioned equidistant to each other. Referring to FIG. 8, each mid support ring 48 has a flexible band 50. Flexible band 50 may be made of aluminum, any suitable flexible metal or any other suitable material known to a person skilled in the art. Flexible band 50 has a top 52, a bottom 54, a pair of peripheral sides 56a and 56b, a first end 58 and a second end 60. Bottom 54 has a plurality of feet 62. Feet 62 may be made of mica, PTFE, silicon, ceramics or any other high temperature composite material known to a person skilled in the art. Feet 62 may extend from peripheral side 56a to peripheral side 56b or may extend only a portion of the distance between peripheral side 56a to peripheral side 56b. Feet 62 may be attached to flexible band 50 by rivets, screws, clamps, glue or any other suitable method of attachment known to a person skilled in the art. Feet 62 of mid support ring 48 engage outer surface 34 of process pipe 12 such that flexible band 50 is spaced from outer surface 34 of process pipe 12. First end 58 of flexible band 20 is linked to second end 36 such that flexible band 50 is held on process pipe 12. In the embodiment shown, first end 58 of flexible band 50 is linked to second end 60 using a tie wire 64. It will be understood by a person skilled in the art that first end 58 and second end 60 may be linked together by staples, welding, rope, screwing, soldering, brazing or any other method of linking known to a person skilled in the art.

Figure 2:
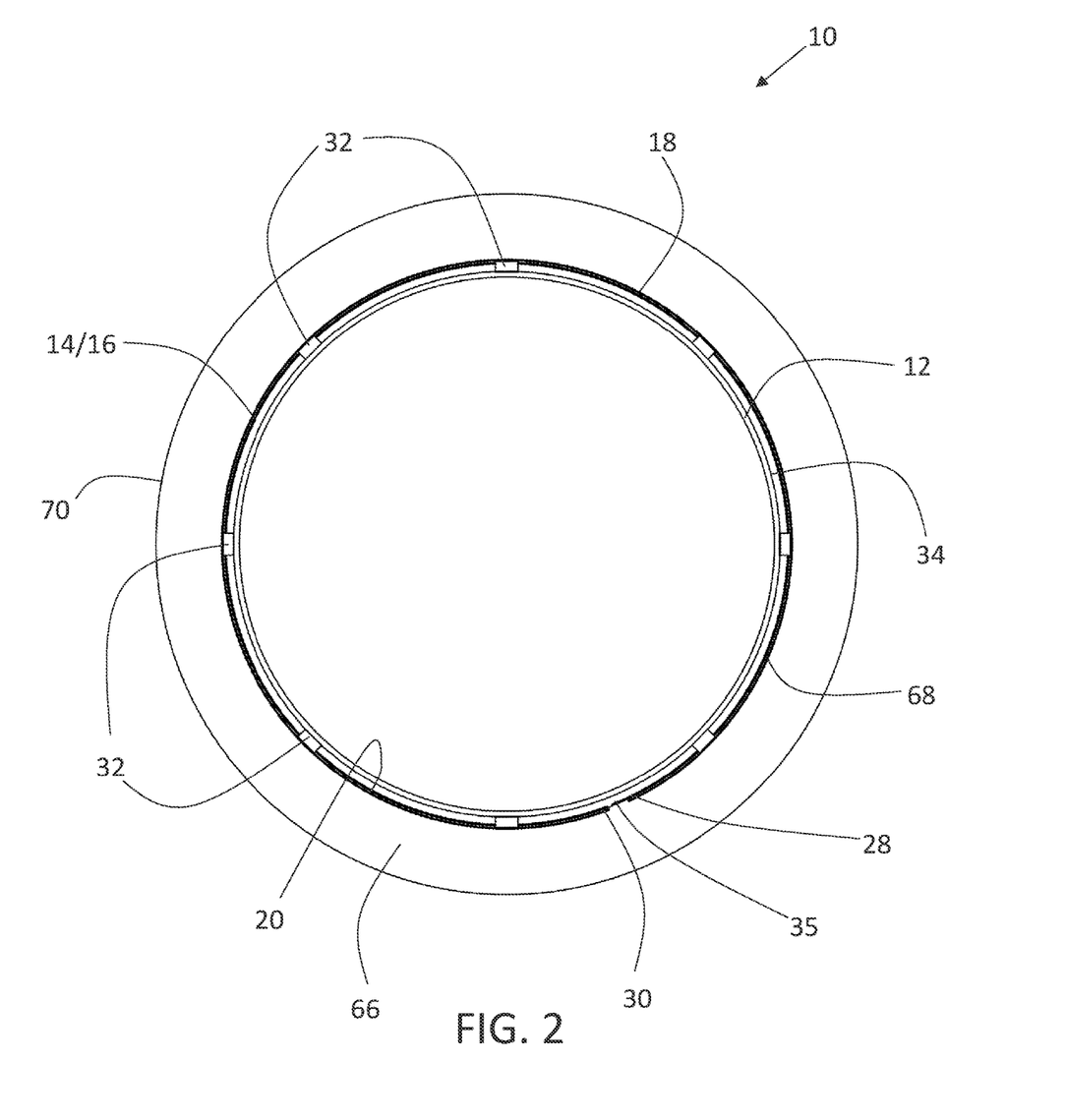
FIG. 2 is an end elevation view of the pipe insulation spacer system.
Figure 3:
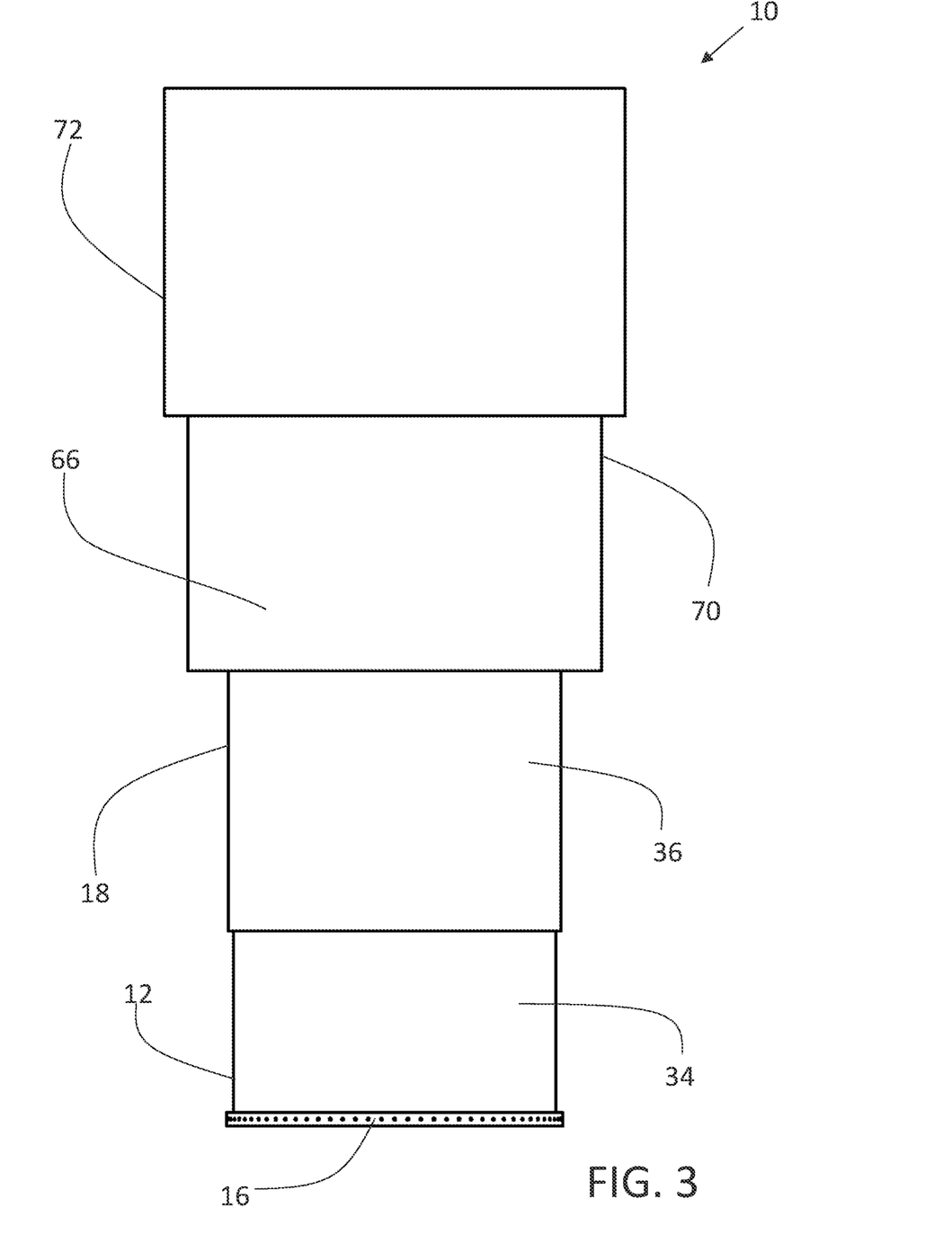
FIG. 3 is a top plan view, partially in section, of the pipe insulation spacer system.
Figure 4:
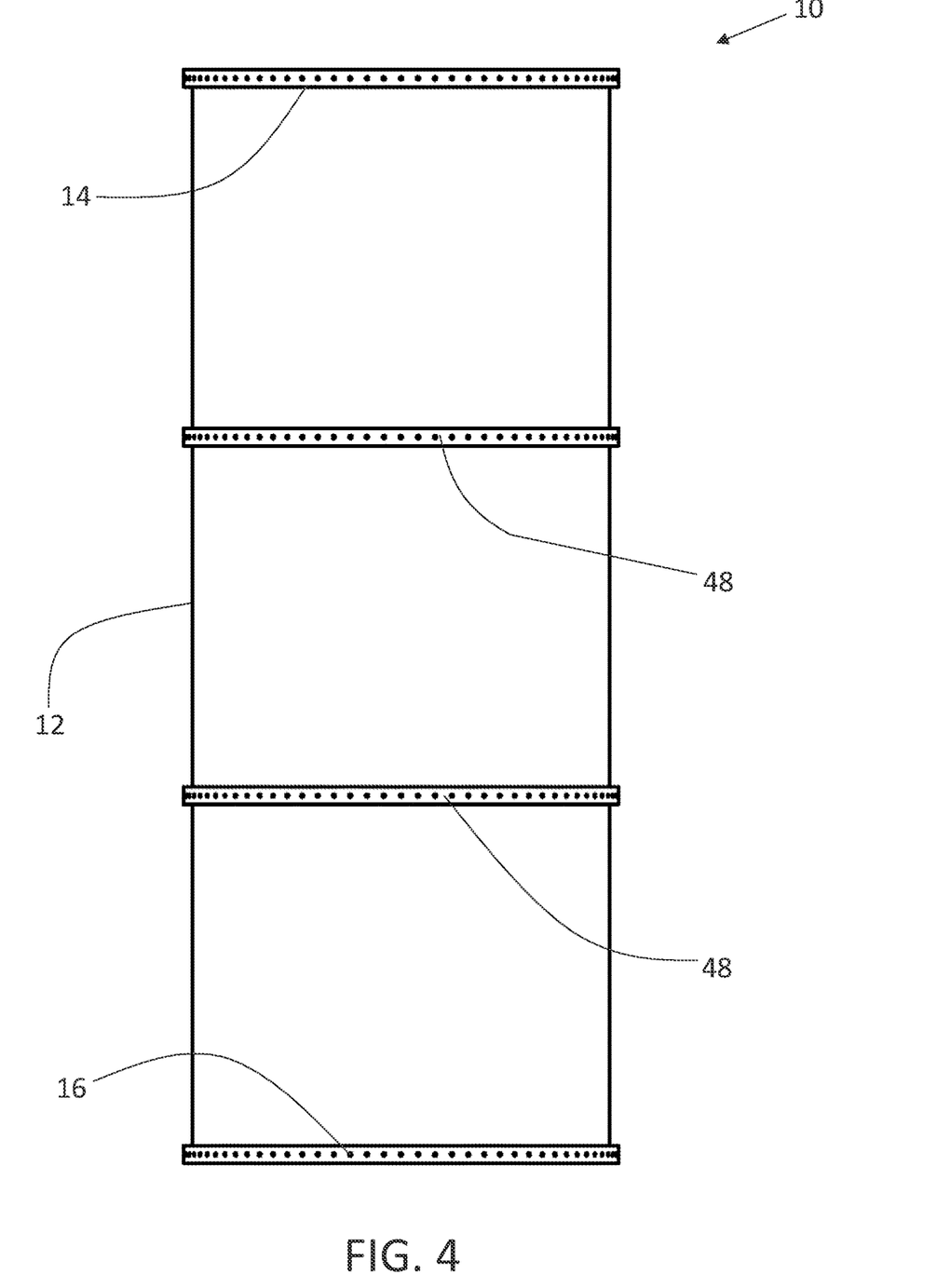
FIG. 4 is a top plan view of a process pipe with spacer rings.

In the embodiment shown in FIG. 2, an insulation material 66 is provided. Insulation material 66 has an inner surface 68 and an outer surface 70. Insulation material is positioned such that inner surface 68 is positioned exterior to and adjacent inner cladding 18. Referring to FIG. 3, an outer cladding 72 is provided and positioned exterior to and adjacent outer surface 70 of insulation material 66.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A pipe insulation spacer system for use on a process pipe, comprising:
    a first end spacer ring and a second end spacer ring, each of the first end spacer ring and the second end spacer ring having a flexible band, the flexible band having a top, a bottom, a pair of peripheral sides, a first end, and a second end, the bottom having a plurality of feet, the feet of each of the first end spacer ring and the second end spacer ring engaging an outer surface of the process pipe such that the flexible band is spaced from the outer surface of the process pipe, the first end of the flexible band being linked to the second end of the flexible band such that the flexible band is held on the process pipe;
    an inner cladding having a body, the body having a first end, a second end, and a pair of peripheral side edges, the pair of the peripheral side edges of the inner cladding being positioned at a bottom of the system, the pair of the peripheral side edges of the inner cladding being spaced apart from each other to create a drain, the first end of the inner cladding being supported by the first end spacer ring and the second end of the inner cladding being supported by the second end spacer ring, the inner cladding wrapping around the process pipe such that the pair of peripheral side edges are adjacent each other and the inner cladding is spaced from the process pipe.

2. The pipe insulation spacer system for use on a process pipe of claim 1 wherein the first end of the flexible band is linked to the second end of the flexible band using a tie wire.

3. The pipe insulation spacer system for use on a process pipe of claim 1 wherein the plurality of feet are made of mica.

4. The pipe insulation spacer system for use on a process pipe of claim 1 wherein the flexible bands are made of aluminum.

5. The pipe insulation spacer system for use on a process pipe of claim 1 wherein the plurality of feet are riveted onto the flexible band.

6. The pipe insulation spacer system for use on a process pipe of claim 1 further comprising at least one mid support ring, each of the at least one mid support rings having a flexible band, the flexible band having a top, a bottom, a pair of peripheral sides, a first end, and a second end, the bottom having a plurality of feet, the feet of the mid support ring engaging an outer surface of the process pipe such that the flexible band is spaced from the outer surface of the process pipe, the first end of the flexible band being linked to the second end of the flexible band such that the flexible band is held on the process pipe.

7. The pipe insulation spacer system for use on a process pipe of claim 6 wherein one of the mid support rings is positioned centrally between the first end spacer ring and the second end spacer ring.

8. The pipe insulation spacer system for use on a process pipe of claim 6 wherein each of the mid support rings is positioned equidistant from each other.

9. The pipe insulation spacer system for use on a process pipe of claim 1 further comprising an insulation material having an inner surface and an outer surface, the insulation material being positioned exterior to the inner cladding.

10. The pipe insulation spacer system for use on a process pipe of claim 9 further comprising an outer cladding positioned exterior to the outer surface of the insulation material.

11. A pipe insulation spacer system for use on a process pipe, comprising:
- a first end spacer ring and a second end spacer ring, each of the first end spacer ring and the second end spacer ring having a flexible aluminum band, the flexible aluminum band having a top, a bottom, a pair of peripheral sides, a first end, and a second end, the bottom having a plurality of feet, the feet of each of the first end spacer ring and the second end spacer ring engaging an outer surface of the process pipe such that the flexible aluminum band is spaced from the outer surface of the process pipe, the first end of the flexible aluminum band being linked to the second end of the flexible aluminum band such that the flexible aluminum band is held on the process pipe;
- an inner cladding having a body, the body having a first end, a second end, and a pair of peripheral side edges, the first end of the inner cladding being supported by the first end spacer ring and the second end of the inner cladding being supported by the second end spacer ring, the inner cladding wrapping around the process pipe such that the pair of peripheral side edges are adjacent each other and the inner cladding is spaced from the process pipe.

12. The pipe insulation spacer system for use on a process pipe of claim 11 wherein the first end of the flexible aluminum band is linked to the second end of the flexible aluminum band using a tie wire.

13. The pipe insulation spacer system for use on a process pipe of claim 11 wherein the pair of the peripheral side edges of the inner cladding are positioned at a bottom of the system.

14. The pipe insulation spacer system for use on a process pipe of claim 13 wherein the pair of the peripheral side edges of the inner cladding are spaced apart from each other to create a drain.

15. The pipe insulation spacer system for use on a process pipe of claim 11 wherein the plurality of feet are made of mica.

16. The pipe insulation spacer system for use on a process pipe of claim 11 wherein the plurality of feet are riveted onto the flexible aluminum band.

17. The pipe insulation spacer system for use on a process pipe of claim 11 further comprising at least one mid support ring, each of the at least one mid support rings having a flexible aluminum band, the flexible aluminum band having a top, a bottom, a pair of peripheral sides, a first end, and a second end, the bottom having a plurality of feet, the feet of the mid support ring engaging an outer surface of the process pipe such that the flexible aluminum band is spaced from the outer surface of the process pipe, the first end of the flexible aluminum band being linked to the second end of the flexible aluminum band such that the flexible aluminum band is held on the process pipe.

18. The pipe insulation spacer system for use on a process pipe of claim 17 wherein one of the mid support rings is positioned centrally between the first end spacer ring and the second end spacer ring.

19. The pipe insulation spacer system for use on a process pipe of claim 17 wherein each of the mid support rings is positioned equidistant from each other.

20. The pipe insulation spacer system for use on a process pipe of claim 11 further comprising an insulation material having an inner surface and an outer surface, the insulation material being positioned exterior to the inner cladding.

21. The pipe insulation spacer system for use on a process pipe of claim 20 further comprising an outer cladding positioned exterior to the outer surface of the insulation material.

\* \* \* \* \*